United States Patent [19]

Sullivan

[11] Patent Number: 5,588,057
[45] Date of Patent: Dec. 24, 1996

[54] APPARATUS FOR DEFEATING RADAR SPEED DETECTION SIGNALS

[75] Inventor: M. David Sullivan, Los Altos, Calif.

[73] Assignee: Voodoo Scientific, Inc.

[21] Appl. No.: 492,472

[22] Filed: Jun. 20, 1995

Related U.S. Application Data

[63] Continuation of Ser. No. 57,160, May 4, 1993, abandoned.

[51] Int. Cl.$^6$ ........................................... G01S 7/38
[52] U.S. Cl. .................................. 380/15; 380/20
[58] Field of Search ................................ 342/14, 15, 20

[56] References Cited

U.S. PATENT DOCUMENTS

| | | | |
|---|---|---|---|
| 2,885,543 | 5/1959 | Williams | 342/14 |
| 3,257,659 | 6/1966 | Siegel | 342/20 |
| 3,258,771 | 6/1966 | Harpster | 342/15 |
| 3,670,333 | 6/1972 | Winn | 342/14 |
| 3,720,952 | 3/1973 | Lawsine | 342/14 |
| 3,953,851 | 4/1976 | Weidstam | 342/14 |
| 4,160,957 | 7/1979 | Jesinger | 342/15 |
| 4,998,110 | 3/1991 | Davis | 342/70 |
| 5,049,884 | 9/1991 | Jaeger et al. | 342/20 |
| 5,321,405 | 6/1994 | Luck | 342/15 |

*Primary Examiner*—Gilberto Barrón, Jr.
*Attorney, Agent, or Firm*—David H. Jaffer

[57] ABSTRACT

Acquisition and interpretation of reflections from a target in response to a Doppler radar probe signal from a seeker are inhibited by providing at the target a receiver, preferably a high-speed sweeping transceiver, which is operative to injection lock quickly to the probe signal and thereafter to repeat a low-power replica of the probe signal with frequency modulation of the carrier from the repeater with a deviation greater than the locking bandwidth of the local oscillator to generate a random aperiodic signal. The vehicle operator is notified of the presence of seeker signals to prompt the operator to verify compliance with vehicle operating regulations. The carrier frequency modulation is selected to be of a frequency and deviation sufficient to confuse phase locking and limiting circuitry in a seeker receiver and thereby to inhibit acquisition of an echo from the target.

10 Claims, 4 Drawing Sheets

APPARATUS FOR DEFEATING RADAR SPEED DETECTION SIGNALS

This is a continuation of applications Ser. No. 08/057,160 filed on May 4, 1993, now abandoned.

BACKGROUND OF THE INVENTION

This invention relates to traffic radar detection and more specifically to down-the-road Doppler radar detection.

In Doppler radar systems and particularly in down-the-road Doppler radar systems, where the axis of the antenna is directed along the line of travel of a target, there are two basic shortcomings with both enforcement and compliance with vehicle speed regulations. First, down-the-road Doppler radar systems are highly susceptible to improper target identification. Furthermore, Doppler radars are also highly susceptible to spurious target-speed readings. A Doppler radar's range typically exceeds 800 meters with a half-power beamwidth of 0.21 to 0.31 radian, substantially more than the cross-sectional area of a vehicle. As a consequence, the radar operator must make a manual determination with a high degree of uncertainty as to the identity of the target vehicle.

The problem of spurious speed readings is a phenomenon of electromagnetic and electromechanical interference effects from common sources, generally from AM or FM transmitters operating in or near the seeker source, including a seeker vehicle's own ignition system, ventilation equipment or the like. While vehicle radar detectors are in widespread use, conventional radar detectors are themselves subject to false responses due to spurious signals.

One way to safeguard a targeted object against the potential shortcomings of Doppler radar is to attempt to defeat echoes or reflections of a seeker radar signal directed at the target. In connection with general countermeasures, such as used in military applications, two active approaches have been suggested: barrage jamming and spot jamming. Barrage jamming has been used in surface vehicle applications, albeit unsuccessfully. It is not known whether spot jamming has ever been used in surface vehicle applications. In barrage jamming, a transmit-only barrage signal spreads countermeasure energy substantially continuously over a bandwidth deemed sufficiently wide to include all possible seeker frequencies in order to mask target echoes. Such an approach presupposes the availability of substantial power, with that power spread over a substantial bandwidth. The barrage method is necessarily wasteful of energy and inhibits or even prevents detection of the presence of a seeker signal.

Alternatively, a spot signal has been used where the operating frequency of the seeker signal was known or could be tracked. If the seeker signal is diverse, or if the exact frequency is not precisely known, there is a need to resort to a look-through scheme wherein a targeted receiver scans to locate an intruding seeker signal and thereafter causes energy to be transmitted on the specific frequency. Such a scheme is limited by the required time to acquire the seeker signal versus the seeker's dwell time at a given frequency and to generate a countermeasure signal at the same frequency. The sophistication of systems to perform such a task is often so costly that cost outweighs the value of the countermeasure. What is needed is a low-cost, effective and efficient countermeasure suitable for general use and which minimizes false positive responses to a seeker system while encouraging compliance of the target with vehicle operating regulations.

SUMMARY OF THE INVENTION

According to the present invention, acquisition and interpretation of signal echoes or reflections from a target in response to a Doppler radar probe signal from a seeker are inhibited by providing at the target a sweeping receiver which is prone to injection lock to the probe signal and thereafter to repeat a low-power replica of the probe signal with frequency modulation of the carrier from the repeater with a deviation greater than the locking bandwidth of the local oscillator. The vehicle operator is notified of the presence of seeker signals to prompt the operator to verify compliance with vehicle operating regulations. The characteristics of the frequency modulation is selected to be of a frequency and deviation sufficient to confuse phase locking and limiting circuitry in a seeker receiver and thereby to prevent acquisition of an echo from the target. The frequency modulation induces random aperiodic energy redistribution among FM side pairs lying within the passband of interest of the seeker receiver so that the repeated signal which is to mask the echoes appears to be frequency incoherent and variable in amplitude. Since seeker radar equipment typically inhibits the display of target information when interference is present, all positive indications are eliminated and locking is prevented to provide the target operator adequate time to verify compliance with vehicle operating regulations.

In a specific embodiment, the X-band at 10,525 MHz transceiver employs a Gunn diode oscillator with a voltage tunable Varactor and a Gallium Arsenide mixer diode in a heterodyne arrangement to sweep over a 50 MHz bandwidth and to produce an injection locked repeated signal within an 8 kHz bandwidth typical for a seeker receiver.

In a further specific embodiment, a K-band transceiver at 24,150 MHz employs a voltage tunable Gunn-diode oscillator and Gallium Arsenide mixer diode in a heterodyne arrangement to sweep over a 200 MHz bandwidth and to produce an injection locked repeated signal within a 15 kHz receiver bandwidth. A loaded Q of about 25 is typical for a non-iris-coupled cavity oscillator. Carrier frequency modulation is initiated after injection lock to assure that lock is broken at the seeking receiver. In a specific embodiment, an audio frequency (4 kHz) tone is frequency modulated by a low-frequency (25 Hz) sawtooth which modulates the carrier of the target transmitter to produce apparent noise of 0 Hz to 15 kHz in the passband of an intermediate frequency stage of the seeker receiver. The apparent noise is similar to noise in the absence of a target echo.

The invention will be explained with respect to K-band operation. However, observations, theory and conclusions apply with equal validity to X-band and Ka-band operation.

DESCRIPTION OF SPECIFIC EMBODIMENTS

Figure 1:
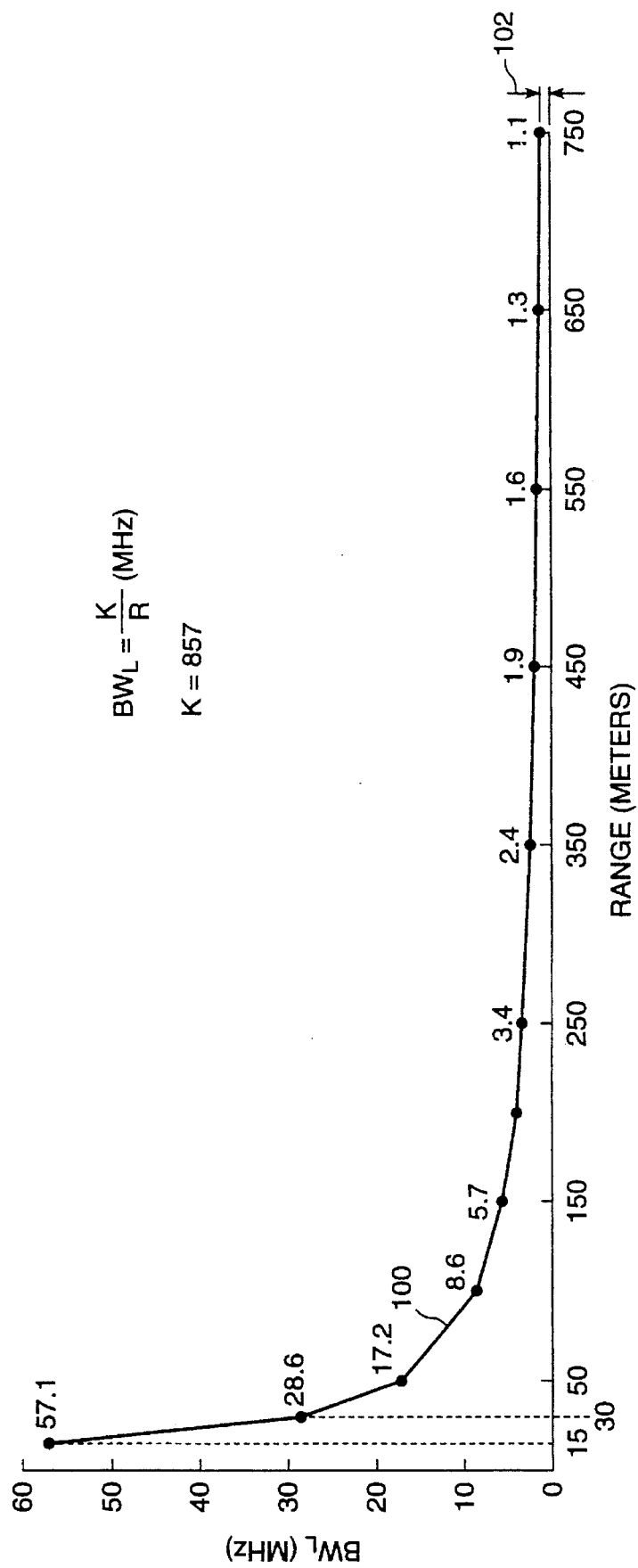
FIG. 1 is a graph showing the relationship between range and locking bandwidth for preselected power levels, antenna gains of the seeker and the target and loaded Q of the transceiver cavity at the target.

In order to understand the operation of the invention, it is helpful to review certain first principles of radar operation.

Equation 1 is the so-called radar equation. This equation describes the returned or echo power $P_e$ as a function of a radar's transmitted power, wavelength, antenna gain, radar cross-section and target range. A target's radar cross-section is the equivalent flat reflective surface which is orthogonal to a radar beam which would return the same echo strength to the radar as does the target.

$$P_e = \frac{P_R \lambda^2 G_R \sigma}{(4\pi)^3 r^4} \quad (1)$$

where $P_e$=returned or echo power $P_R$=radar's transmitted power $\lambda$=wavelength $G_R$=radar antenna gain $\sigma$=radar cross-section; and r=target range Equation 2 below expresses the countermeasure power received by the seeker as a function of the transmitted power, antenna gain and polarization. The power returned to the seeker of an echoed signal of Equation 1 is sensitive to the fourth power of the range, whereas the power received by the radar from the countermeasure is sensitive only to the second power of range. As will be seen, this provides an advantage for a countermeasure signal.

$$P_c = \frac{P_T G_T \lambda^2 p}{4\pi r^2} G_R \quad (2)$$

where $P_c$=countermeasure power received by radar $P_T$=countermeasure's transmitted power $G_T$=countermeasure's antenna gain p=polarization mismatch factor Equations 1 and 2 may be combined to express an advantage ratio AR which describes relative countermeasure power versus the echo power received by the seeker radar receiver. A large advantage can be realized if the countermeasure induces a signal in the receiver of the seeker radar which lies within the passband of the seeker radar, owing to the term $r^2/\sigma$, which is quantified as:

$$AR = \frac{P_c}{P_e} = (4\pi)^2 \frac{P_T G_T p}{P_R G_R} \frac{r^2}{\sigma} \quad (3)$$

This advantage ratio holds if the countermeasure is able to maintain stability within the passband of the seeker receiver, an effect which is almost impossible to maintain for an autonomous transmitter given temperature effects and other effects on the oscillator in the countermeasure apparatus.

One way to keep the transmitted countermeasure signal within the passband of the seeker receiver intermediate frequency is to injection lock the countermeasure signal to the transmit frequency of the seeker signal. A countermeasure signal will be injection locked to a seeker signal whenever the frequency offset between the two is less than the injection lock bandwidth $BW_L$, which is given by:

$$BW_L = \frac{2f_o}{Q_L} \sqrt{\frac{P_i}{P_T}} \quad (4)$$

where $f_o$=operating frequency $P_i$=power injected by radar into countermeasure's cavity oscillator $Q_L$=countermeasure cavity's loaded Q $P_T$=countermeasure's transmitted power The injection power $P_i$ can be expressed in a form following Equation 2 to account for mismatch, range, antenna gains and radar transmitted power as follows:

$$P_i = \frac{P_R G_R G_T \lambda^2 p}{4\pi r^2} \quad (5)$$

This value for injected power can be substituted into Equation 4 to yield an injection lock bandwidth expression as follows:

$$BW_L = \frac{3 \times 10^8}{r Q_L} \sqrt{\frac{P_R G_R G_{Tp}}{\pi P_T}} \quad (6)$$

For specific values of loaded Q ($Q_L$) equal to about 25, $G_T$ equal to 80, and $P_T$ equal to 10 mW, for a circularly polarized seeker signal of 20 mW into an antenna with a gain of 200, Equation 6 reduces to the following expression:

$$BW_L = \frac{857}{r} \text{ (MHz)} \quad (7)$$

where r is expressed in meters.

Figure 2A:
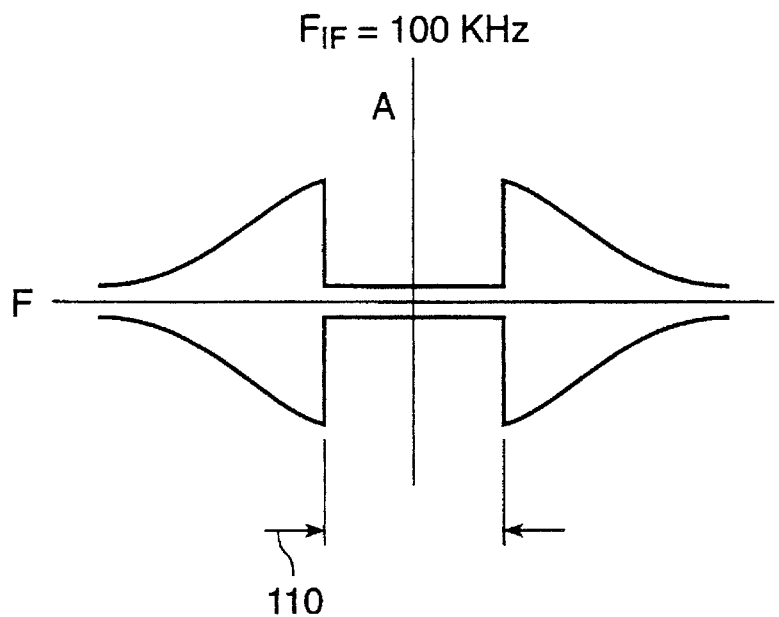
FIG. 2A is a graph of amplitude in the IF stage of the countermeasure apparatus as a function of time to illustrate locking sensitivity to a strong radar signal.
Figure 2B:
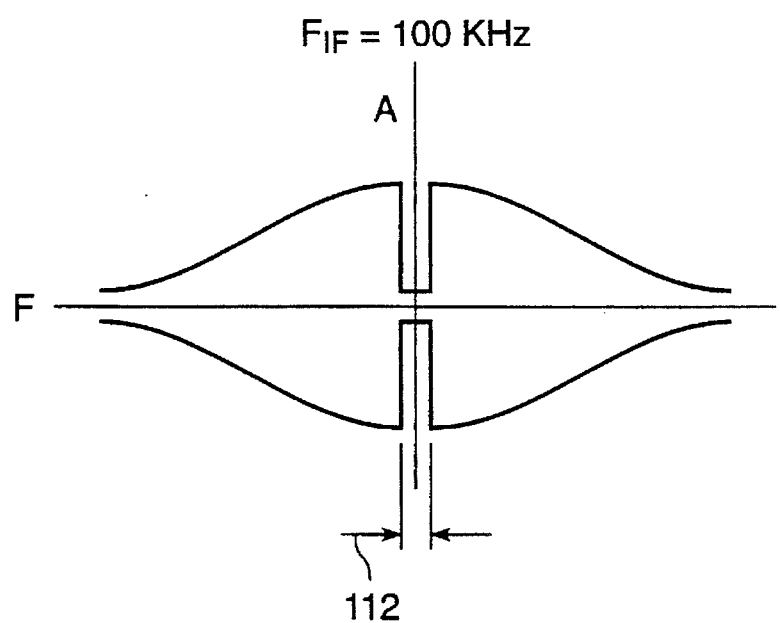
FIG. 2B is a graph of amplitude in the IF stage of the countermeasure apparatus as a function of time to illustrate locking sensitivity to a weak radar signal.

Equation 7 defines the locked bandwidth in the specific case of a K-band system of the type herein explained. Equation 7 is illustrated by FIG. 1. Curve 100 holds for a constant K equal to 857, which in turn is based on the foregoing specific values selected for this calculation. If frequency modulation is used to cause random aperiodic energy redistribution among FM side pairs lying within the radar passband, the apparent echo to the seeker will be frequency incoherent and highly variable in amplitude, thereby precluding intelligibility of a radar's seeker receiver. For a strong field, a broad lock 110 is effected, as illustrated in FIG. 2A. In a weak field, only a narrow lock 112 is possible, as shown in FIG. 2B.

To create the FM side pairs in the far field with attendant minimal locking bandwidths, the target transmitter must place a signal on or near the frequency of the seeker signal. At 760 meters distance, which is the approximate maximum effective range of a Doppler radar system, the passband or lock bandwidth 102 is 1.12 MHz, as illustrated in FIG. 1. The target receiver must therefore sweep between 24,050 MHz and 24,250 MHz in the K-band to locate the seeker frequency.

According to the invention, when the frequency of the sweeping oscillator in the target approaches the frequency of the seeker radar signal, an oscillation locking effect is used at the target to lock onto a seeking radar signal in order to permit a spot countermeasure signal to be generated to defeat the seeking radar. The locking effect initially tends to force the frequency of a sweeping oscillator in a transceiver element of the target to the frequency of the seeker radar signal. The countermeasure signal may be a frequency modulated carrier signal which forces the sweeping oscillator out of lock randomly and aperiodically so as to generate a signal which appears as noise to a seeker receiver.

In a specific implementation where the sweeping oscillator is subject to chirp effects which could break lock, a primary and secondary sweep are employed to assure that lock is maintained. As the frequency of the output of the mixed or heterodyned signal of the sweeping oscillator and the seeking radar passes (quickly) through the range of the passband of the intermediate frequency amplifier in the countermeasure apparatus, a burst of energy is passed through a filter to a sensor (comparator) which causes the sweeping oscillator to terminate sweep at a short fixed interval after the sensed burst. Initially sweep is terminated at a time after initial capture and at an intended frequency greater than the frequency of the characteristic chirp effect caused by rapid voltage changes on Gunn oscillators, so that if the oscillator is pulled out of lock by the chirp effect (as in the weak field case) it can be reliably returned to be within the locking bandwidth. This offset is always reliably greater than a 1–3 MHz chirp frequency uncertainty. Thereafter, using the known separation and known sign of the separation, a secondary sweep of substantially lower rate is used to pull the oscillator frequency back relatively slowly toward the seeker frequency to be within the locking bandwidth of oscillation. The chirp effect at the lower rate sweep is incapable of breaking lock. Where a primary sweep rate of about 5 ms is used, the secondary sweep rate is only about 1/20th as fast. The primary sawtooth sweep is fast enough to inhibit radar seeker acquisition of a target before a countermeasure signal is generated. The minimum allowable sweep rate assures capture and countermeasure generation at any frequency of interest within 100 milliseconds, which is the typical acquisition time for a seeking Doppler radar system.

The secondary sweep produces only a minute amount of chirp, due to low power level and smaller sweep range (preferably between 6 MHz and 8 MHz). This secondary sweep allows the oscillator circuit to be precisely tuned within the radar passband as far away as the maximum range of the seeker radar system. A secondary sweep requires less than about 2 milliseconds. After the secondary sweep has been terminated thus tuning the oscillator circuit to a range within the radar's passband, the oscillator in the target device is held at a frequency within the passband.

Chirp effect problems are thermally related and are typical of Gunn diode type oscillators. There may be other sweeping oscillator types which suffer from frequency drift problems and which may benefit from primary/secondary sweep techniques. However, the scope of this disclosure is intended to include sweeping oscillators capable of injection locking with a radio/radar/optical beam, as in a transceiver cavity.

Figure 3A:
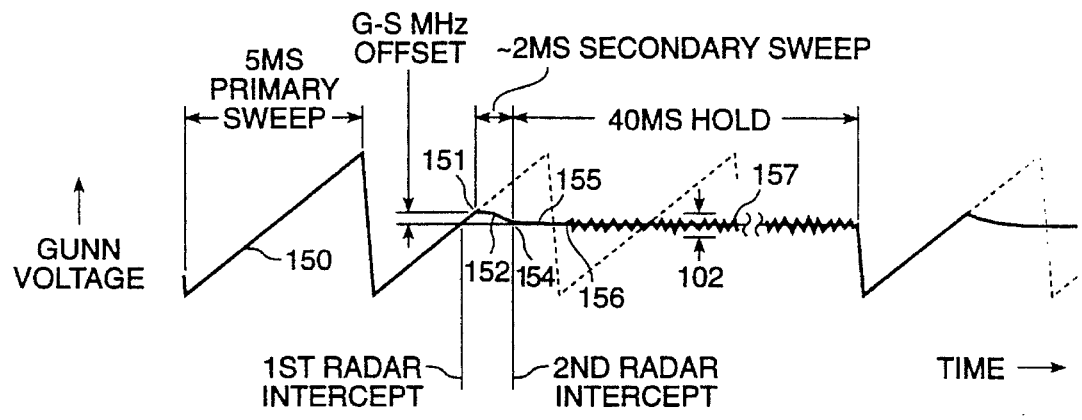
FIG. 3A is a graph illustrating variations in oscillator tuning voltage over time for a sweeping oscillator in the countermeasure apparatus during stages of seek, intercept and hold.
Figure 3B:
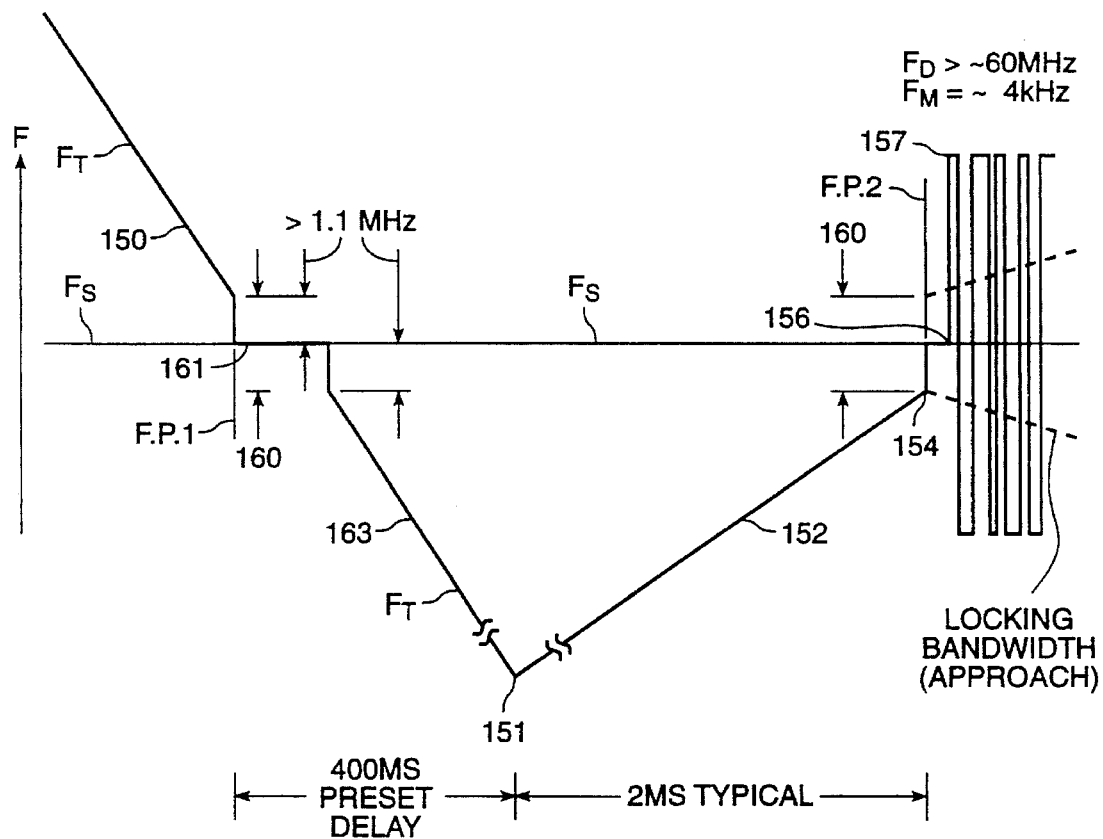
FIG. 3B illustrates a detail of oscillator frequency as a function of time.

FIG. 3A and FIG. 3B depict a typical acquisition and hold cycle as explained above using primary and secondary sweep. Where chirp effect is not a concern, the secondary sweep is unneeded. FIG. 3A illustrates oscillator tuning voltage as a function of time. FIG. 3B illustrates a detail of oscillator frequency as a function of time. In operation, the primary sweep 150 repeats each 5 ms in the absence of a radar signal. A first radar intercept point or firing point 1 (F.P. 1) occurs at some point during a sweep. The sweeping oscillator locks to the seeking radar according to the invention, as soon as the frequency of the sweeping radar falls within the oscillation locking bandwidth (FIG. 3B F.P. 1). A burst of energy from the mixed signal extracted from the oscillator is used as a trigger for a countermeasure signal. If chirp effects are not a concern, the trigger starts a signal which frequency modulates the oscillator signal, causing it to be transmitted. The deviation of the frequency modulated signal is sufficient to cause the oscillator to break lock randomly and aperiodically during period 157. Otherwise, at a point 151 after a fixed interval following intercept, and assuming that the chirp effect could cause a break in lock due to a relatively narrow locking bandwidth 160, a secondary sweep 152 is initiated to reverse the sweep direction. Such a break in lock is illustrated in FIG. 3B as segment 163 following lock segment 161. The secondary sweep 152 brings the carrier frequency of the oscillator within the locking bandwidth 160 at a termination point 154. After the time point 151, or thereafter, at time point 156, modulation 157 is applied. The burst of energy emitted by the mixer is sensed in an intermediate frequency amplifier 28 through a low Q bandpass filter 30. The bandwidth of the bandpass filter is selected to be about 100 kHz so as to pass energy bursts caused by the injection locking transitions. This 100 kHz passband permits use of a tuned intermediate frequency amplifier which enhances noise rejection in the circuitry of the receiver.

Figure 4:
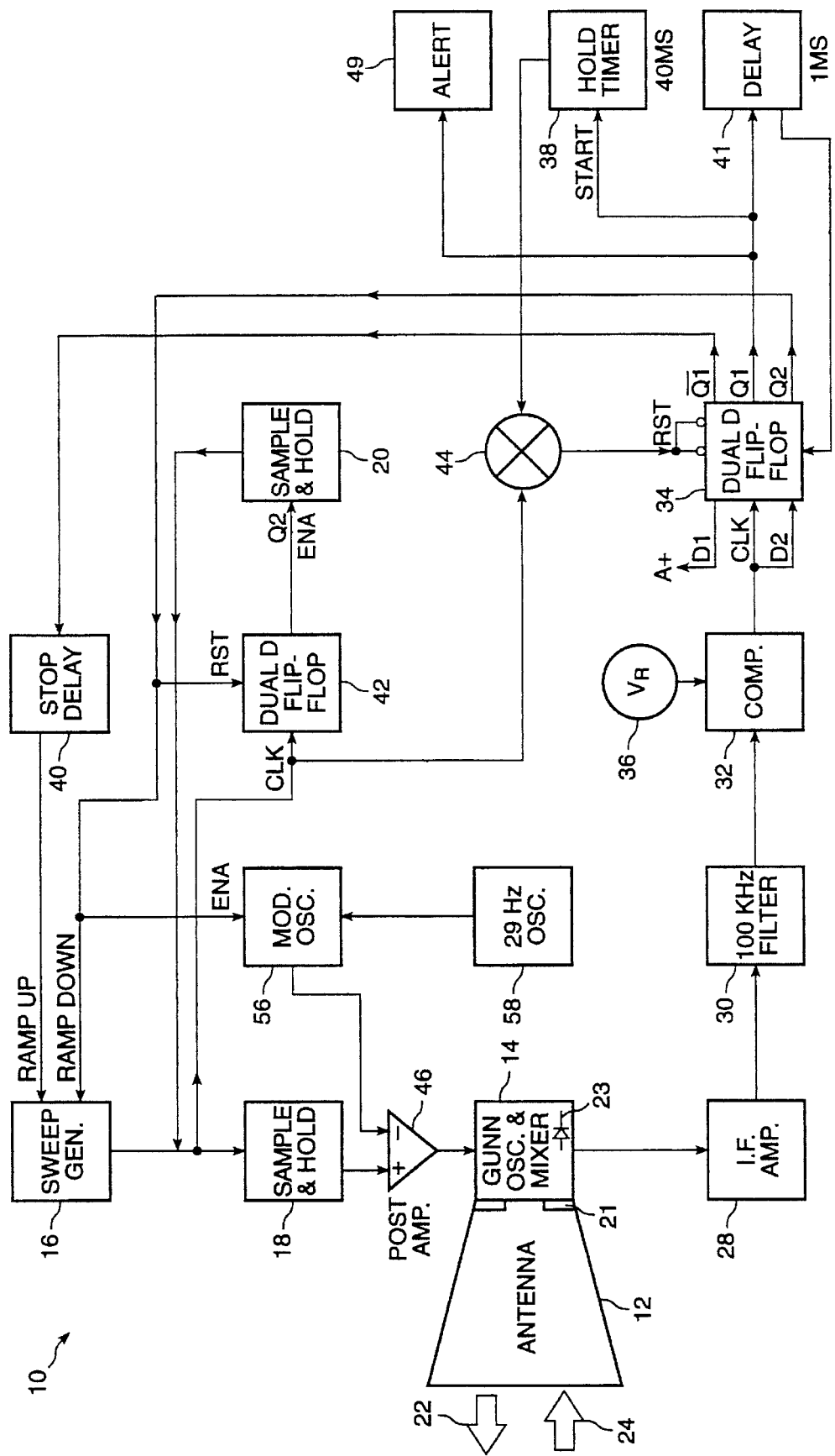
FIG. 4 is a block diagram of a transceiver in accordance with the invention.

Referring to FIG. 4, there is shown a block diagram of a circuit in accordance with the invention, namely, a countermeasure apparatus 10 at a potential radar target. A horn antenna 12 is electrically and mechanically coupled to an oscillator and mixer stage 14 through a rectangular aperture 21 (a standard TE10 waveguide). The structure of such an oscillator and mixer stage 14 is conventional art, and it is therefore unnecessary to describe in detail. The oscillator and mixer stage 14 is electrically controlled by a sawtooth voltage ramp generator 16 whose output is provided through a first sample and hold circuit 18, as hereinafter explained. A second sample and hold circuit 20 is also provided to maintain a carrier frequency of the oscillator and mixer 14 stage, as hereinafter explained, by providing an alternative input to the first sample and hold circuit 18.

K-band and X-band circuit embodiments are substantially identical except that in the K-band embodiment, the sweep signal from the sweep generator 16 is applied directly to a Gunn diode 23 within the oscillator and mixer stage 14 so as the voltage tune the oscillator. In the X-band, however, the oscillator diode preferably operates at a fixed voltage, and sweep is applied to a Varactor diode within the cavity in a manner known to the art. Sweep is provided via a Varactor diode since a Gunn diode does not have an adequate tuning range in the X-band.

Direct Gunn-type modulation produces carrier amplitude modulation, since the output power is a function of the Gunn bias voltage. This is a secondary effect which is tolerable and inconsequential to the operation according to the invention.

The antenna 12 is preferably a low-cost pyramidal horn affixed to the cavity of the oscillator and mixer stage 14 at a rectangular aperture 21 (shown diagrammatically). The configuration results in a rectangularly polarized radio beam when emitted from the cavity through the antenna. Alternatively, a circularly polarized scheme may be used, subject to a trade-offs of cost since seeker signals are expected to be circularly polarized. For a rectangularly polarized signal, a polarization mismatch factor P is 3 dB, and it is easily tolerated due to the inherent large power advantage of the transmitted signal 22 over a seeker signal 24.

The oscillator/mixer stage 14 is coupled to an intermediate frequency amplifier 28, the output of which is provided through a filter 30 having a passband of approximately 100 kHz to a comparator 32. The comparator threshold level is set by a reference voltage element 36. The output of the comparator 32 is provided as a clock signal to a first dual D-type flipflop 34. A first data input D1 is held high so that a first output Q1bar of the first flipflop 34 is also normally high. This signal is coupled to drive sweep generator 16 in a normal active high, increasing voltage ramp ("ramp up")

through a first delay 40. Any negative-going change on this signal line is propagated through the delay 40 after 400 μs. (An increase in the voltage through the sweep generator 16 causes the frequency of a Gunn oscillator 23 to decrease but the frequency of a Varactor-controlled oscillator to increase). The second output Q1 complementing Q1bar is coupled to a second delay 41. The second delay 41 is coupled to the second data input D2 of the first dual D flipflop 34. Any positive-going change in Q1 is propagated to input D2, which is otherwise normally low, after 1 ms. Thus, the output of third output Q2 is not triggered until a second clock is observed from the comparator 32. The second clock is caused by the second intercept at point 154 (FIG. 3A or FIG. 3B). Through third output Q2 "ramp down" signal is provided to the sweep generator 16. In this embodiment, the "ramp down" signal is only effective in the absence of a "ramp up" signal. The second output Q1 also provides a start signal to a hold timer 38 (which is for timing the duration of the countermeasure signal), and third output Q2 provides an alert signal to an alert element 49, such as an audible alarm and/or visual indicator, to alert a vehicle operator to the presence of a seeking signal and prompt the operator to verify compliance with applicable regulations affecting the vehicle.

The third output Q2 also provides a reset signal to a second dual D flipflop 42 and an enable signal to a modulator 56. The second flipflop 42 is clocked by the flyback of sweep generator 16 which in turn enables the second sample and hold element 20. The second sample and hold element 20 provides an alternative voltage input control to the oscillator/mixer stage 14. The output of the hold timer 38 is mixed with the flyback output of the sweep generator 16 at a mixer 44 to provide a reset signal to the first flipflop 34.

Modulator/oscillator 56, which operates at 4 kHz, is enabled by the third output Q2 from the first flipflop 34. Modulator/oscillator is coupled to an oscillator 58 which frequency modulates modulator/oscillator 56 at 25 Hz. The output is coupled to a postamplifier 46 for modulating the voltage at the output of the sample and hold circuit 18 during the period of the countermeasure signal.

Operation is as follows: The sweep generator 16 induces a varying sweep voltage across the oscillator portion (Gunn diode or Varactor diode) of the oscillator and mixer stage 14, exciting a mixer diode (not shown) within the cavity which, upon encountering a seeker radar signal, develops a difference frequency signal. The difference frequency signal is passed through to intermediate frequency amplifier 28, which in turn drives filter 30. As the oscillator carrier is swept toward intercept with the seeker radar signal, the filter 30 will pass energy of the heterodyned (mixed) signal within the IF passband and thus emit a burst sensed by the comparator 32 as it exceeds the reference threshold of voltage reference 36. The reference threshold determines system sensitivity and hence a maximum distance detection range in conjunction with the limiting level of the IF amplifier 28.

The comparator 32 output clocks the first dual flipflop 34 causing first output Q1 bar to issue an enable signal which terminates the primary (ramp up) sweep after a preselected delay set by the delay element 40. This delay allows the frequency of the carrier to pass the intercept point and to terminate sweep in order to mask or swamp the expected chirp of the Gunn oscillator and to provide a signal with a known direction of carrier offset. The sweep generator 16 and the sample and hold circuit 18 then apply a secondary sweep to the oscillator and mixer stage 14 as shown as segment 152 in FIG. 3A and FIG. 3B. Segment 150 represents the primary sweep (voltage in FIG. 3A, frequency in FIG. 3B), an up-ramp with a fast fly-back. It is continued as segment 163 after the first intercept. The secondary sweep signal applied to the oscillator mixer stage 14 causes the sweep to go in the opposite direction from the primary sweep at a much lower sweep rate (e.g. ½0th the primary sweep rate), thus tuning the oscillator mixer stage 14 back toward the intercept frequency at intercept point 154 (FIG. 3B). The filter 30 then passes the captured signal once again to the comparator 32 causing it to re-clock the flipflop 34 causing its second output Q2 to go high, which in turn causes the sweep generator 16 to cease functioning and the sample and hold circuit 18 to maintain the current voltage at the value which caused the secondary intercept. The output Q1 also triggers the hold timer 38 to an active state to start a time-out for the mixer 44 to control the reset signal on the first flipflop. After the desired hold interval (of about 40 ms), transitions from the hold timer 38 reset the flipflop 34 through the mixer 44, which again initiates a new sweep operation to again acquire radar signals from a seeker radar. This hold period is short enough to ensure that sample and hold drift will not affect carrier accuracy and to ensure that there are periodic updates of the radar frequency within the sweep range.

A start signal from the flipflop 42 also enables modulator 56 driven by oscillator source 58 so as to impress a carrier frequency modulation on the voltage at the output of the sample and hold circuit 18. The 25 Hz oscillator 58 is a very low frequency oscillator which frequency modulates the 4 kHz carrier modulator and thus prevents radar display of the speed corresponding to 4 kHz when the target is stationary. A stationary target develops no Doppler shifted signal to suppress a weak 4 kHz component which would otherwise be displayed in a seeker receiver. This modulation also forces random aperiodic breaking of lock of the injection locked signal, since deviation is selected to be generally substantially greater than the locking bandwidth for the sweeping oscillator. The locking bandwidth increases with field strength, as during approach to a seeker, but deviation is generally selected so that lock can always be broken.

The system 10 is set up so that after lock has been established, the circuit assumes that multi-path cancellation has occurred if subsequent sweeps fail to detect a seeker radar signal. The circuit therefore triggers second dual flipflop 42 to cause its output to go high, which inserts a sample and hold signal from second sample and hold circuit 20 into the input to the Gunn oscillator and mixer stage 14 in order to maintain oscillator tuning at the last known secondary input value. The condition will be held until a seeker radar is re-acquired, as would be evidenced by a toggling of the output Q2 of the flipflop 34 resetting the second flipflop 42 to take the sample and hold circuit 20 off line.

If and when the target vehicle is in compliance with operating regulations, the vehicle operator may turn off the countermeasure unit 10 (at the power supply), thereby allowing the seeker to acquire the target and display a report. However, if the unit is not turned off, even a large crosss-section target will not generate a report so long as the lock-breaking countermeasure signal is effective, i.e, so long as the deviation of the countermeasure signal is greater than the locking bandwidth, which is typically over separation distances greater than 20 feet.

The invention has now been explained with reference to specific embodiments. Other embodiments will be apparent to those of ordinary skill in the art. It is therefore not intended that this invention be limited except as indicated by the appended claims.

What is claim is:

1. An apparatus for inhibiting capture by a remote seeking radar signal receiver of a return signal of a Doppler-type seeking radar signal, said apparatus comprising:

a microwave voltage-controlled oscillator means (MVCO) coupled to an antenna means for receiving seeking radar signals and for emitting a local oscillator signal;

a sweep control means coupled to said MVCO for sweeping a frequency range of said seeking radar signals at a first sweep rate with said local oscillator signal;

means coupled to said MVCO and to said first sweep control means for detecting an intercept of said seeking radar signals by said local oscillator signal by heterodyning said local oscillator signal and said seeking radar signals and for stopping sweeping of said local oscillator signal within an injection locking bandwidth of said intercept so that said oscillator signal locks to said seeking radar signals; and means coupled to said MVCO for frequency modulating said local oscillator signal in order to cause emission through said antenna means of a frequency modulated carrier signal with deviation greater than the injection-locking bandwidth of said local oscillator signal.

2. The apparatus according to claim 1 wherein said MVCO includes a Gunn oscillator which is voltage tunable.

3. The apparatus according to claim 1 wherein said MVCO includes a Varactor tuning element which is voltage tunable.

4. An apparatus for inhibiting capture by a remote seeking radar signal receiver of a return signal of a Doppler-type seeking radar signal, said apparatus comprising:

a microwave voltage-controlled oscillator means (MVCO) coupled to an antenna means for receiving seeking radar signals and for emitting a local oscillator signal through an antenna means;

a first sweep control means coupled to said MVCO for sweeping a first frequency range of said seeking radar signals at a first sweep rate with said local oscillator signal;

means coupled to said MVCO and to said first sweep control means for detecting an intercept of said seeking radar signal by said local oscillator signal by heterodyning said local oscillator signal and said seeking radar signals and for stopping sweeping of said local oscillator signal at a preselected offset from said intercept;

a second sweep control means coupled to said MVCO for retuning said local oscillator signal toward said intercept at a second sweep rate, said intercept being within an injection-locking bandwidth of said local oscillator means; and means coupled to said MVCO for frequency modulating Said local oscillator signal in order to cause emission of a frequency modulated carrier countermeasure signal through said antenna means with deviation greater than the injection-locking bandwidth of said local oscillator signal.

5. The apparatus according to claim 4 wherein said MVCO includes a Gunn oscillator which is voltage tunable.

6. The apparatus according to claim 4 wherein said MVCO includes a Varactor tuning element which is voltage tunable.

7. The apparatus according to claim 4 wherein said detecting means includes an intermediate frequency amplifier, a bandpass filter coupled to receive output of said intermediate frequency amplifier, comparator means coupled to receive output of said bandpass filter, and trigger means, wherein said bandpass filter passes a heterodyned signal to said comparator means when said heterodyned signal is within a preselected passband, said heterodyned signal so filtered causing said trigger means to initiate retuning of said local oscillator frequency and to initiate frequency modulation of said local oscillator frequency as said frequency modulated carrier signal.

8. The apparatus according to claim 7 wherein said first sweep rate and said second sweep rate have a combined period which is less than an expected acquisition time of a seeking radar signal by said remote receiver.

9. A method for inhibiting capture by a remote seeking radar signal receiver of a return signal of a Doppler-type seeking radar signal, said method comprising the steps of:

receiving seeking radar signals at an antenna means;

sweeping a frequency range including frequency of said seeking radar signals with a local oscillator signal;

detecting a intercept of said seeking radar signals by said local oscillator signal by heterodyning said seeking radar signals and said local oscillator signal;

stopping sweeping of said local oscillator signal after detecting said intercept within an injection locking bandwidth of said intercept so that said oscillator signal locks to said seeking radar signals; and thereafter frequency modulating said local oscillator signal in order to cause emission from said antenna means of a frequency-modulated carrier signal with deviation greater than the injection-locking bandwidth of said local oscillator signal.

10. A method for inhibiting capture by a remote seeking radar signal receiver of a return signal of a Doppler-type seeking radar signal, said method comprising:

receiving seeking radar signals at an antenna means;

sweeping a first frequency range including frequency of said seeking radar signals at a first sweep rate with a local oscillator signal;

detecting an intercept of said seeking radar signals by said local oscillator signal by heterodyning said seeking radar signals and said local oscillator signal;

stopping sweeping of said local oscillator signal at a preselected offset from said intercept after detecting said intercept; thereafter retuning said local oscillator signal to said intercept at a second sweep rate and stopping sweeping of said local oscillator signal within an injection locking bandwidth of said intercept so that said local oscillator signal locks to said seeking radar signals; and thereafter frequency modulating said local oscillator signal in order to cause emission from said antenna means of a frequency-modulated carrier signal with deviation greater than the injection-locking bandwidth of said local oscillator signal.

* * * * *